(12) United States Patent
Thiebaut et al.

(10) Patent No.: US 12,513,601 B2
(45) Date of Patent: Dec. 30, 2025

(54) METHODS AND APPARATUSES FOR DETERMINATION OF NON-3GPP INTERWORKING FUNCTION (N3IWF)

(71) Applicant: NOKIA TECHNOLOGIES OY, Espoo (FI)

(72) Inventors: Laurent Thiebaut, Antony (FR); Bruno Landais, Pleumeur-Bodou (FR); Georgios Gkellas, Petroupoli (GR)

(73) Assignee: NOKIA TECHNOLOGIES OY, Espoo (FI)

( * ) Notice: Subject to any disclaimer, the term of this patent is extended or adjusted under 35 U.S.C. 154(b) by 863 days.

(21) Appl. No.: 17/704,699

(22) Filed: Mar. 25, 2022

(65) Prior Publication Data
US 2023/0308990 A1    Sep. 28, 2023

(51) Int. Cl.
| | | |
|---|---|---|
| *H04W 48/14* | (2009.01) | |
| *H04W 48/16* | (2009.01) | |
| *H04W 48/18* | (2009.01) | |
| *H04W 92/02* | (2009.01) | |

(52) U.S. Cl.
CPC ........... *H04W 48/14* (2013.01); *H04W 48/16* (2013.01); *H04W 48/18* (2013.01); *H04W 92/02* (2013.01)

(58) Field of Classification Search
CPC .................................................... H04W 48/14
USPC ........................................................ 455/434
See application file for complete search history.

(56) References Cited

U.S. PATENT DOCUMENTS

| | | | |
|---|---|---|---|
| 10,609,530 B1 * | 3/2020 | Patil | ........................... G06F 8/65 |
| 2019/0208562 A1 * | 7/2019 | Kim | ...................... H04W 76/16 |
| 2021/0068045 A1 * | 3/2021 | Regnault | ................. H04L 43/10 |

OTHER PUBLICATIONS

3rd Generation Partnership Project; Technical Specification Group Services and System Aspects; Procedures for the 5G System (5GS); Stage 2 (Release 17), 3GPP TS 23.502, V17.3.0, Dec. 2021.
3rd Generation Partnership Project; Technical Specification Group Services and System Aspects; System architecture for the 5G System (5GS); Stage 2 (Release 17), 3GPP TS 23.501, V17.3.0, Dec. 2021.
3rd Generation Partnership Project; Technical Specification Group Services and System Aspects; Study on the support for 5WWC, Phase 2 (Release 18), 3GPP TR 23.700-17, V0.1.0, Mar. 2022.

* cited by examiner

*Primary Examiner* — Qutbuddin Ghulamali
(74) *Attorney, Agent, or Firm* — SQUIRE PATTON BOGGS (US) LLP

(57) ABSTRACT

Systems, methods, apparatuses, and computer program products for determination of non-3GPP interworking function(s) (N3IWFs), which support slices targeted by a device or user equipment (UE), are provided. One method may include transmitting, by a UE or device, a request to at least one network node. The request may be to obtain information on network slices supported by at least one N3IWF. The method may also include receiving, from the at least one network node, a response comprising information for one or more N3IWFs and, based on the received information for the N3IWF(s), selecting one of the N3IWF(s) to use to connect to a 5G core network (5GC).

20 Claims, 6 Drawing Sheets

METHODS AND APPARATUSES FOR DETERMINATION OF NON-3GPP INTERWORKING FUNCTION (N3IWF)

FIELD

Some example embodiments may generally relate to communications including mobile or wireless telecommunication systems, such as Long Term Evolution (LTE) or fifth generation (5G) radio access technology or new radio (NR) access technology or 5G beyond (e.g., 6G) access technology, or other communications systems. For example, certain example embodiments may generally relate to systems and/or methods for determination of non-3$^{rd}$ Generation Partnership Project (3GPP) interworking function(s) (N3IWF(s)) that supports slices targeted by the UE.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology, 5G beyond and/or sixth generation (6G) radio access technology. 5G wireless systems refer to the next generation (NG) of radio systems and network architecture. A 5G system may be mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 5G beyond or 6G is expected to support further use cases beyond current mobile use scenarios, such as virtual and augmented reality, artificial intelligence, instant communications, improved support of IoT, etc.

SUMMARY

An embodiment may include an apparatus comprising at least one processor and at least one memory comprising computer program code. The at least one memory and computer program code configured, with the at least one processor, to cause the apparatus at least to transmit a request to at least one network node, wherein the request is to get information on network slices supported by at least one non-3GPP interworking function (N3IWF), to receive, from the at least one network node, a response comprising information for the at least one non-3GPP interworking function (N3IWF), and, based on the received information for the at least one non-3GPP interworking function (N3IWF), to select one of the at least one non-3GPP interworking function (N3IWF) to use to connect to a 5G core network (5GC).

An embodiment may include a method comprising transmitting, by a user device, a request to at least one network node, wherein the request is to get information on network slices supported by at least one non-3GPP interworking function (N3IWF). The method may also include receiving, from the at least one network node, a response comprising information for the at least one non-3GPP interworking function (N3IWF), and based on the received information for the at least one non-3GPP interworking function (N3IWF), selecting one of the at least one non-3GPP interworking function (N3IWF) to use to connect to a 5G core network (5GC).

An embodiment may include an apparatus comprising means for transmitting a request to at least one network node, wherein the request is to get information on network slices supported by at least one non-3GPP interworking function (N3IWF), means for receiving, from the at least one network node, a response comprising information for the at least one non-3GPP interworking function (N3IWF), and, based on the received information for the at least one non-3GPP interworking function (N3IWF), means for selecting one of the at least one non-3GPP interworking function (N3IWF) to use to connect to a 5G core network (5GC).

An embodiment may include an apparatus comprising at least one processor and at least one memory comprising computer program code. The at least one memory and computer program code configured, with the at least one processor, to cause the apparatus at least to: receive a register request or update request from at least one non-3GPP interworking function (N3IWF), wherein the register request or update request comprises an indication of a set of network slices supported by the at least one non-3GPP interworking function (N3IWF) and at least an internet protocol (IP) address of the at least one non-3GPP interworking function (N3IWF) for use by user devices connecting to the N3IWF; store or update a non-3GPP interworking function (N3IWF) profile comprising the set of network slices supported by the at least one non-3GPP interworking function (N3IWF) and the internet protocol (IP) address(es) of the at least one non-3GPP interworking function (N3IWF) for use by user devices connecting to the N3IWF; receive, from a user device, a discovery request comprising a set of network slices targeted by the user device; based on the non-3GPP interworking function (N3IWF) profile, select at least one non-3GPP interworking function (N3IWF) that supports at least one of the set of network slices targeted by the user device; and transmit, to the user device, a response comprising the set of non-3GPP interworking function profiles supporting at least one of the network slices targeted by the user device.

An embodiment may include a method comprising receiving a register request or update request from at least one non-3GPP interworking function (N3IWF), wherein the register request or update request comprises an indication of a set of network slices supported by the at least one non-3GPP interworking function (N3IWF) and at least an internet protocol (IP) address of the at least one non-3GPP interworking function (N3IWF) for use by user devices connecting to the non-3GPP interworking function (N3IWF). The method may also include storing or updating a non-3GPP interworking function (N3IWF) profile comprising the set of network slices supported by the at least one non-3GPP interworking function (N3IWF) and the internet protocol (IP) address of the at least one non-3GPP interworking function (N3IWF) for use by user devices connecting to the non-3GPP interworking function (N3IWF), and receiving, from a user device, a discovery request comprising a set of network slices targeted by the user device. Based on the non-3GPP interworking function (N3IWF) profile, the method may include selecting at least one non-3GPP interworking function (N3IWF) that supports at least one of the set of network slices targeted by the user device, and transmitting, to the user device, a response comprising the set of non-3GPP interworking function (N3IWF) profiles supporting at least one of the network slices targeted by the user device.

An embodiment may include an apparatus comprising means for receiving a register request or update request from at least one non-3GPP interworking function (N3IWF), wherein the register request or update request comprises an indication of a set of network slices supported by the at least one non-3GPP interworking function (N3IWF) and at least an internet protocol (IP) address of the at least one non-3GPP interworking function (N3IWF) for use by user devices connecting to the non-3GPP interworking function (N3IWF). The apparatus may also include means for storing or updating a non-3GPP interworking function (N3IWF) profile comprising the set of network slices supported by the at least one non-3GPP interworking function (N3IWF) and the internet protocol (IP) address of the at least one non-3GPP interworking function (N3IWF) for use by user devices connecting to the non-3GPP interworking function (N3IWF), and means for receiving, from a user device, a discovery request comprising a set of network slices targeted by the user device. Based on the non-3GPP interworking function (N3IWF) profile, the apparatus may include means for selecting at least one non-3GPP interworking function (N3IWF) that supports at least one of the set of network slices targeted by the user device, and means for transmitting, to the user device, a response comprising the set of non-3GPP interworking function (N3IWF) profiles supporting at least one of the network slices targeted by the user device.

An embodiment may include an apparatus comprising at least one processor and at least one memory comprising computer program code. The at least one memory and computer program code configured, with the at least one processor, to cause the apparatus at least to receive, from a user device, a request for information on network slices supported by the apparatus, and to transmit, to the user device, a response comprising information on the network slices supported by the apparatus.

An embodiment may include a method comprising receiving, from a user device, a request for information on network slices supported by a non-3GPP interworking function (N3IWF), and transmitting, to the user device, a response comprising information on the network slices supported by the non-3GPP interworking function (N3IWF).

An embodiment may include an apparatus comprising means for receiving, from a user device, a request for information on network slices supported by a non-3GPP interworking function (N3IWF), and means for transmitting, to the user device, a response comprising information on the network slices supported by the non-3GPP interworking function (N3IWF).

BRIEF DESCRIPTION OF THE DRAWINGS

For proper understanding of example embodiments, reference should be made to the accompanying drawings, wherein.

DETAILED DESCRIPTION

Figure 1:
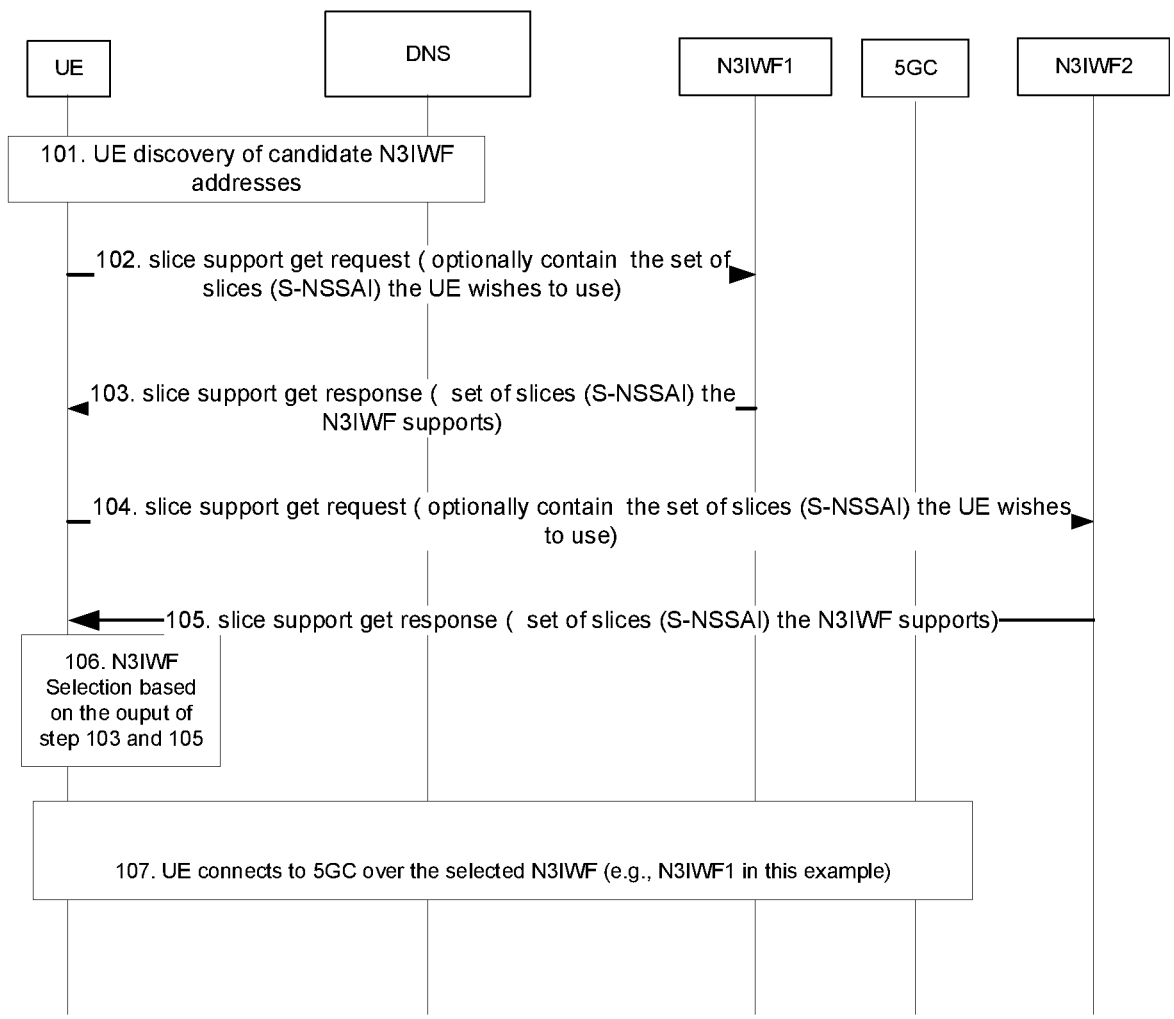
FIG. 1 illustrates an example signaling diagram of N3IWF discovery, according to one example embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for determination of N3IWF that supports slices targeted by the UE, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

A N3IWF is the edge 5G core entity that interfaces (via N2 or N3 interfaces) with the rest 5G core (5GC) functions to support untrusted non-3GPP access, as defined in 3GPP technical specification (TS) 23.501 § 6.2.9. As part of 3GPP Release-18, enhancements on non-3GPP access to 5GC are being considered, such as wireline (via access gateway function (AGF)), untrusted (via N3IWF) and trusted (via trusted non-3GPP gateway function (TNGF)) non-3GPP access.

Currently, there is no way to determine how to select a TNGF and/or N3IWF that supports the network slice selection assistance information (NSSAI) needed by the UE. It is possible that different N3IWF will support different set of slices. Therefore, a solution is needed for selecting a TNGF and/or N3IWF that supports the S-NSSAI(s) requested by the UE during registration via non-3GPP access network.

Therefore, there is the possibility for different non-3GPP access gateways (e.g., AGF, N3IWF, TNGF) and the possibility for different instances of each of AGF, N3IWF, TNGF to support different sets of slices. Certain embodiments may provide at least a method for selecting a TNGF and/or N3IWF that supports the S-NSSAI(s) requested by the UE during registration via non-3GPP access network.

Some example embodiments may provide a method in which the UE(s) can themselves select the N3IWF that supports the set of slices the UE(s) wishes to use. For this purpose, certain embodiments may include two possibilities. A first possibility may include a UE being able to issue a hypertext transfer protocol (HTTP) slice support get onto each candidate N3IWF and to receive, from each N3IWF, the list of slices this N3IWF supports. A second possibility may include the UE being able to discover the N3IWF based on a discovery request containing the set of slices the UE wishes to use, which is sent to a new network function (NF) that may act similarly to a 5GC network repository function (NRF) (where the N3IWF registers onto this new NF).

According to certain embodiments, as part of a N3IWF selection procedure, when a UE has selected a public land mobile network (PLMN) and has a set of candidate N3IWF, the UE may issue a slice support get request to each of these N3IWF. Upon receiving a slice support get request, each of the N3IWF may answer with the list of slices it supports in a slice support get response. Then, the UE can take into account the set of slices it wishes to use and the slices supported by the candidate N3IWF as indicated in the slice support get responses to select a N3IWF that best supports the slices the UE wishes to use. For example, in some embodiments, the slices that the UE wishes to use may include requested NSSAI if the N3IWF selection is part of a UE registration request over N3IWF, or may be allowed NSSAI if the N3IWF selection is part of a UE service request over N3IWF. This approach may be especially useful when there are a limited number of N3IWFs that the UE might interact with (e.g., via slice support get) to determine the appropriate N3IWF to connect to.

Further embodiments may provide more advanced solutions that can be applicable, for instance, for large PLMNs or when numerous N3IWFs are deployed.

For example, some embodiments may provide a method to enable the UE to perform a N3IWF discovery procedure to a new "AN NRF" node (which may be defined similarly to 5GC NRF defined in 3GPP TS 23.501), to which N3IWFs would register. For example, the N3IWFs may register to this new "AN NRF" using the Nnrf_NFManagement_N-FRegister service operation as defined in 3GPP TS 23.502 or a new service operation supported by a new NF. Then, the UE(s) may just perform one "AN NRF" query, e.g., using the Nnrf_NFDiscovery_NFDiscover service operation as defined in 3GPP TS 23.502 or a new similar service operation supported by a new NF. This would mean that the UE would not need to perform as many queries as there are N3IWFs.

In one embodiment, the UEs may discover the "AN NRF" node via a domain name system (DNS) query. Therefore, according to this example embodiment, there is provided a definition of a new AN NRF as a dedicated NRF for AN NF discovery by the UE. For instance, the UE may discover the AN NRF using a fully qualified domain name (FQDN), and the UE may use the discovery result for selecting the N3IWF to connect to. The FQDN pattern used to discover the AN NRF may be, for example:

an-nrf.5gc.mnc<MNC>.mcc<MCC>.pub.3gppnetwork. org, where the <MNC> and <MCC> may identify the PLMN where the N3IWF is to be located and can be encoded as: <MNC>=3 digits, <MCC>=3 digits.

FIG. 1 illustrates an example signaling diagram for N3IWF discovery using a slice support get message, according to an embodiment. As illustrated in the example of FIG. 1, at 101, the UE may perform discovery of candidate N3IWF addresses (e.g., per 3GPP R17 23.501 § 6.3.6). At 102, the UE may transmit a slice support get request to a N3IWF, shown as N3IWF1 in the example of FIG. 1. The slice support get request may optionally contain the set of slices (S-NSSAI) the UE wishes to use (indicating to N3IWF that there is no need to answer with slices outside this set). At 103, N3IWF1 may transmit, and the UE may receive, a slice support get response that may include the set of slices (S-NSSAI) the N3IWF supports. This set of slices (S-NSSAI) may optionally be restricted to contain only a subset of the set of slices (S-NSSAI) the UE has indicated in the slice support get request.

As further illustrated in the example of FIG. 1, at 104, the UE may transmit a slice support get request to a N3IWF, shown as N3IWF2 in the example of FIG. 1. Similarly, the slice support get request may optionally contain the set of slices (S-NSSAI) the UE wishes to use (indicating to N3IWF that there is no need to answer with slices outside this set). At 105, N3IWF2 may transmit, and the UE may receive, a slice support get response that may include the set of slices (S-NSSAI) the N3IWF supports. The set of slices (S-NSSAI) may optionally be restricted to contain only a subset of the set of slices (S-NSSAI) the UE has indicated in the slice support get request. It is noted that, although the example of FIG. 1 includes two N3IWF, additional N3IWFs may be included according to further embodiments.

In the example of FIG. 1, at 106, the UE may select a N3IWF based on the set of slices (S-NSSAI) the N3IWFs support, as indicated in the received slice support get responses received at 103 and 105. At 107, the UE may connect to 5GC over the selected N3IWF. It is noted that the procedure depicted in the example of FIG. 1 is stateless, as the N3IWF does not need to store any information related with a slice support get request. According to some embodiments, the "slice support get" service may be designed as a new (HTTPs) application programming interface (API) exposed by the N3IWF to the UE and defined by 3GPP.

In certain embodiments, if within the set of candidate N3IWF(s) there are N3IWF(s) that support this "slice support get" procedure and other(s) that do not, the UE may select the N3IWF to use in the following descending order of priority as follows: (1) N3IWF(s) that support the "slice support get" procedure and that have indicated they support the set of slices (S-NSSAI) the UE wishes to use, (2) N3IWF(s) that do not support the "slice support get" procedure, and (3) N3IWF(s) that support the "slice support get" procedure and that have indicated they do not support some set of slices (S-NSSAI) the UE wishes to use. It may be implementation specific as to how the UE considers N3IWF(s) that support the "slice support get" procedure and that have indicated they support only a subset of the slices (S-NSSAI) the UE wishes to use.

It is noted that FIG. 1 provided as one example according to certain embodiments; however, other examples or modifications to FIG. 1 are possible according to some embodiments, such as the use of different types of messages or nodes.

Figure 2:
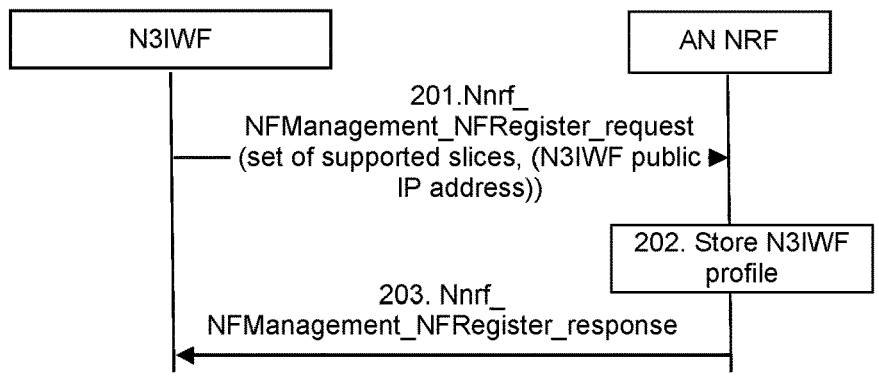
FIG. 2 illustrates an example signaling diagram of N3IWF registration, according to an example embodiment.
Figure 3:
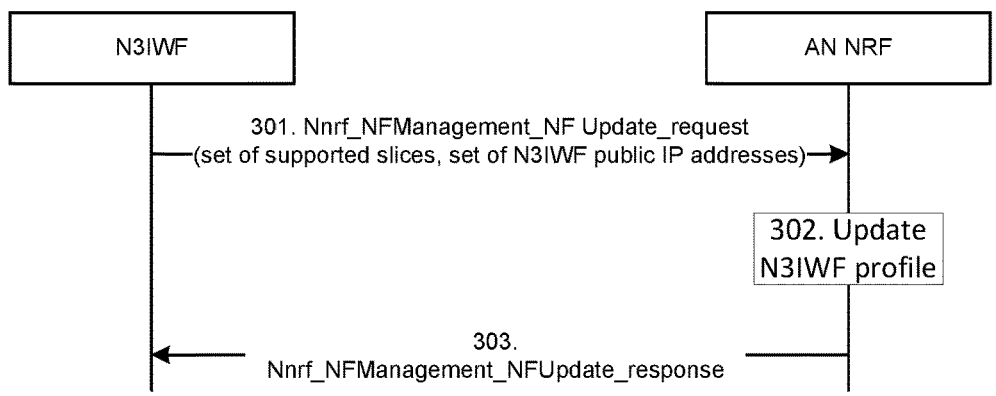
FIG. 3 illustrates an example signaling diagram of N3IWF updating registration, according to an example embodiment.
Figure 4:
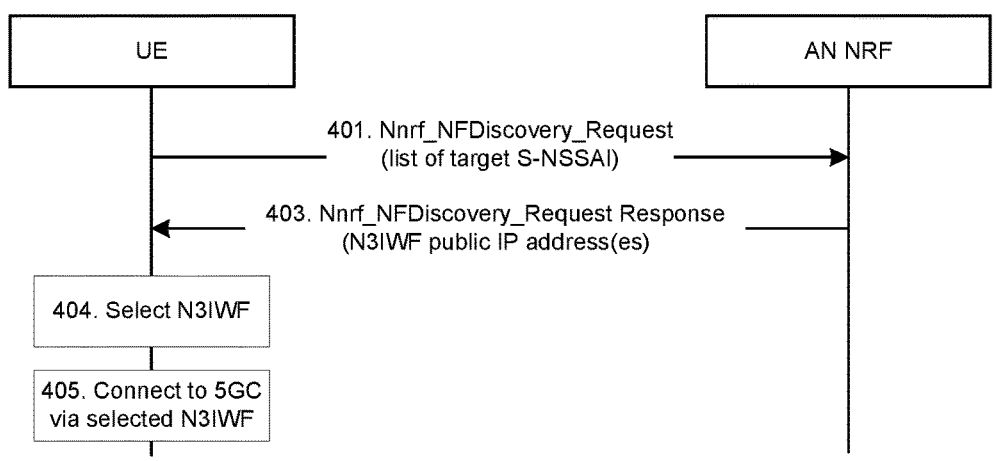
FIG. 4 illustrates an example signaling diagram of N3IWF discovery, according to one example embodiment.

FIGS. 2-4 illustrate examples of procedures that can enable a UE to perform a N3IWF discover procedure to a new AN NRF, according to certain embodiments. For instance, the procedures of FIGS. 2-4 may be useful for large PLMNs and/or when numerous N3IWFs are deployed.

FIG. 2 illustrates an example signaling diagram depicting a N3IWF registering onto an AN NRF, according to an embodiment. As illustrated in the example of FIG. 2, at 201, the N3IWF may transmit a NF register request, i.e., Nnrf_NFManagement_NFRegister request, to the AN NRF. The request at 201 may include or indicate a set of supported slices (S-NSSAI(s)) and/or N3IWF public IP address(es). At 202, the AN NRF may store the N3IWF profile. Thus, the N3IWF information newly configured on the AN NRF may contain one or multiple S-NSSAI(s) (with possible wildcarding) and/or one or multiple N3IWF public IP addresses for use by UEs connecting to the N3IWF (NwuN3IWF IP address). At 203, the AN NRF may transmit, and the N3IWF may receive, a NF register response, i.e., Nnrf_NFManagement_NFRegister_response.

FIG. 3 illustrates an example signaling diagram depicting a N3IWF updating an existing registration onto an AN NRF, according to an embodiment. As illustrated in the example of FIG. 3, at 301, the N3IWF may transmit a NF update request, i.e., Nnrf_NFManagement_NFUpdate_request, to the AN NRF. The request at 301 may include or indicate an updated set of supported slices (S-NSSAI(s)) and/or N3IWF public IP address(es). At 302, the AN NRF may store the updated N3IWF profile. Thus, the N3IWF information updated on the AN NRF may contain one or multiple S-NSSAI(s) and/or one or multiple N3IWF public IP addresses for use by UEs connecting to the N3IWF. At 303, the AN NRF may transmit, and the N3IWF may receive, a NF update response, i.e., Nnrf_NFManagement_NFUpdate_response.

It is noted that the procedures depicted in the examples of FIG. 2 and FIG. 3 may be run independently of any UE attempt to get N3IWF access. Furthermore, FIGS. 2 and 3 are provided as examples according to certain embodiments; however, other examples or modifications are possible according to some embodiments.

FIG. 4 illustrates an example signaling diagram depicting a UE discovering a suitable N3IWF using AN NRF, according to an embodiment. As illustrated in the example of FIG. 4, at 401, the UE may transmit a NF discovery request, i.e., Nnrf_NFDiscovery_Request, to the AN NRF. The NF discovery request at 401 may include a list of target slices (e.g., S-NSSAI) that the UE wishes to use. At 403, the AN NRF may transmit, and the UE may receive, a NF discovery response, i.e., Nnrf_NFDiscovery_Request Response. The NF discovery response may include at least a N3IWF public IP address for a matching N3IWF that serves the list of target slices requested by the UE. In some embodiments, the AN NRF may take into account both the list of target S-NSSAI requested by the UE and the UE IP address (source address of the AN NRF request) to determine a best matching N3IWF that serves the list of target S-NSSAI requested by the UE and where one of the Nwu N3IWF IP address is close to the UE IP address. According to an embodiment, in case AN NRF returns more than one N3IWFs that support the slices the UE intends to use, the UE, at 404, can select one of them and connect to it. In case AN NRF does not find any N3IWF supporting the slices requested by the UE, then the NF discovery response 403 may include a list of N3IWFs, the slices that each N3IWF supports and their NWu address(es). The UE, based on implementation means, may select, at 404, one of the received N3IWFs and connect to it.

As also illustrated in the example of FIG. 4, at 405, the UE may connect to 5GC via the selected or received N3IWF (e.g., as defined in 3GPP R17 23.502 § 4.12.2.2 or § 4.12.4.1).

It is noted that FIG. 4 provided as one example according to certain embodiments; however, other examples or modifications to FIG. 4 are possible according to some embodiments, such as the use of different types of messages or nodes.

Figure 5:
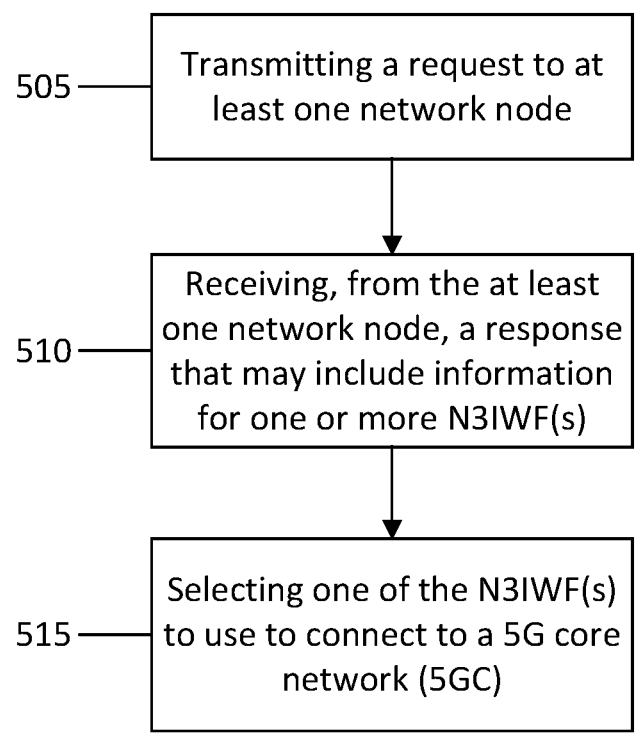
FIG. 5 illustrates an example flow diagram of a method, according to an embodiment.

FIG. 5 illustrates an example flow diagram of a method for N3IWF determination or discovery, according to an example embodiment. In certain example embodiments, the flow diagram of FIG. 5 may be performed by a network entity or communication device in a communications system such as, but not limited to, LTE, 5G NR, or beyond 5G (e.g., 6G). For instance, in some example embodiments, the communication device performing the method of FIG. 5 (and operations discussed below) may include or be included in a user device, UE, sidelink (SL) UE, wireless device, mobile station, IoT device, UE type of roadside unit (RSU), a wireless transmit/receive unit, customer premises equipment (CPE), other mobile or stationary device, or the like. For instance, in certain example embodiments, the method of FIG. 5 may include procedures or operations performed by a UE, such as the UE illustrated in FIG. 1 and/or FIG. 4, or as described or illustrated elsewhere herein.

As illustrated in the example of FIG. 5, the method may include, at 505, transmitting, by a user device, a request to at least one network node, such as N3IWF(s) or AN NRF(s). The request may be to get information on network slices supported by one or more N3IWFs. In one example, the request may include an indication of a set of network slices that the user device targets or wishes to use. For example, in an embodiment, the indication of the set of network slices may include at least a single network slice selection assistance information (S-NSSAI) or similar information.

In one embodiment, the method may include issuing a DNS request to a DNS server to determine which network node to query for N3IWF discovery.

In the example of FIG. 5, the method may include, at 510, receiving, from the at least one network node, a response that may include information for one or more N3IWF(s). As also illustrated in the example of FIG. 5, the method may then include, at 515, based on the received information for the N3IWF(s), selecting one of the N3IWF(s) to use to connect to a 5G core network (5GC).

According to certain embodiments, the at least one network node may be a set of one or more candidate N3IWFs, and the request transmitted at 505 may be a slice support get request, e.g., as illustrated in the example of FIG. 1. In this embodiment, the response received at 510 may be a slice support get response from the one or more candidate N3IWFs, and the information for the N3IWF(s) may include a set of network slices that the one or more candidate N3IWFs support. In an embodiment, the slice support get request and slice support get response may be transmitted via HTTP. According to an embodiment, the selecting 515 may include the user device selecting one of the candidate N3IWFs that serves the set of network slices that the user device wishes to use based on the set of network slices that the one or more candidate N3IWFs support.

According to certain embodiments, when the set of one or more candidate N3IWFs includes at least one N3IWF that supports a slice support get procedure and at least one N3IWF that does not support the slice support get procedure, the selecting 515 may include selecting the N3IWFs to use in the following descending order of priority: (a) non-3GPP interworking function (N3IWF) that supports the slice support get procedure and has indicated support for the set of network slices the user device wishes to use, (b) non-3GPP interworking function (N3IWF) that does not support the slice support get procedure, and (c) non-3GPP interworking function (N3IWF) that supports the slice support get procedure and that has indicated it does not support at least some set of slices that the user device wishes to use.

In some embodiments, the at least one network node may be an access network (AN) network repository function (NRF), and the request transmitted at 505 may be a network function discovery request, e.g., as illustrated in the example of FIG. 4. In this embodiment, the response received at 510 may be a network function discovery response from the access network (AN) network repository function (NRF), and the information for the at least one N3IWF may include a N3IWF profile that may include at least an internet protocol (IP) address of a N3IWF that serves the set of network slices that the user device wishes to use. According to an embodiment, the selecting 515 may include selecting the N3IWF with the received IP address that serves the maximum possible set of network slices that the user device wishes to use.

Figure 6A:
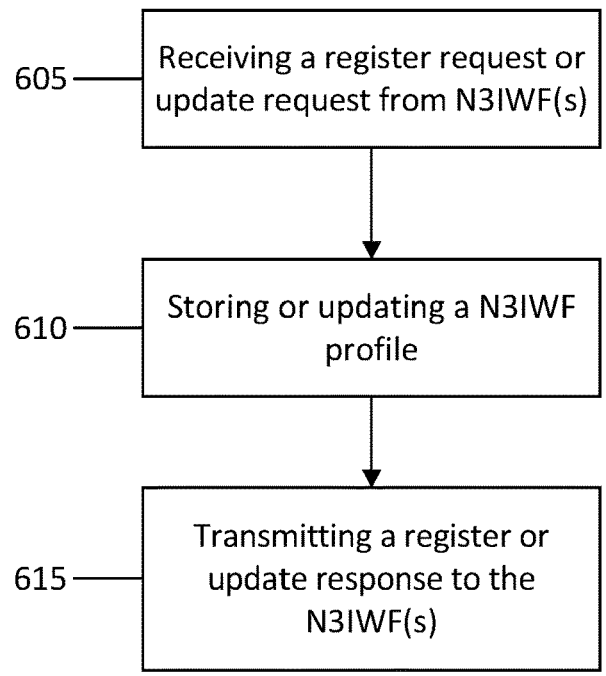
FIG. 6A illustrates an example flow diagram of a method, according to an embodiment.

FIG. 6A illustrates an example flow diagram of a method for N3IWF determination or discovery, according to an example embodiment. In certain example embodiments, the flow diagram of FIG. 6A may be performed by a network entity or communication device in a communications system such as, but not limited to, LTE, 5G NR, or 5G beyond. For instance, in some example embodiments, the device performing the method of FIG. 6A may include an access network (AN) network repository node or NRF. For instance, in some embodiments, the method of FIG. 6A may include procedures or operations performed by an AN NRF, as described or illustrated elsewhere herein, such as in FIGS. 2-4.

As illustrated in the example of FIG. 6A, the method may include, at 605, receiving a register request or update request from at least one N3IWF. The register request or update request may include an indication of a set of network slices supported by the at least one N3IWF and at least an IP address of the at least one N3IWF.

In an embodiment, the method of FIG. 6A may include, at 610, storing or updating a N3IWF profile including the set of network slices supported by the at least one N3IWF and the at least one IP address of the at least one N3IWF. According to some embodiments, the method may also include, at 615, transmitting a register or update response to the at least one N3IWF.

Figure 6B:
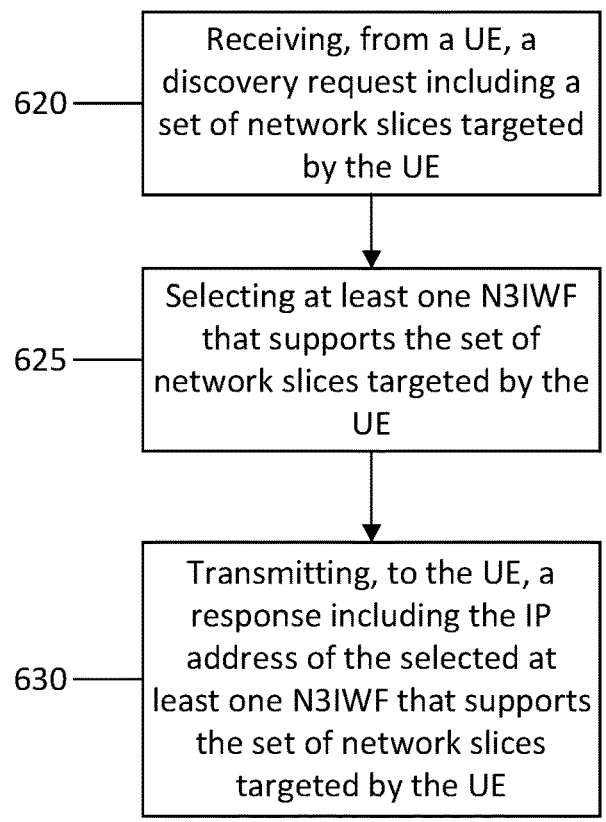
FIG. 6B illustrates an example flow diagram of a method, according to an embodiment.

FIG. 6B illustrates an example flow diagram of a method for N3IWF determination or discovery, according to an example embodiment. In certain example embodiments, the flow diagram of FIG. 6B may be performed by a network entity or communication device in a communications system such as, but not limited to, LTE, 5G NR, or 5G beyond. For instance, in some example embodiments, the device performing the method of FIG. 6B may include an access network (AN) network repository node or NRF. For instance, in some embodiments, the method of FIG. 6B may include procedures or operations performed by an AN NRF, as described or illustrated elsewhere herein, such as in FIGS. 2-4. It is noted that, in some embodiments, the method depicted in FIG. 6A may be combined with the method depicted in FIG. 6B.

According to certain embodiments, the method of FIG. 6B may include, at 620, receiving, from a UE or user device, a discovery request including a set of network slices targeted by the UE. Based on the stored non-3GPP interworking function (N3IWF) profile, the method may include, at 625, selecting at least one N3IWF that supports the set of network slices targeted by the user device. In an embodiment, the selecting 625 may include determining an appropriate or suitable N3IWF to select for the UE by taking into account the set of network slices targeted by the UE and a distance between the IP address of the UE and the IP address of the at least one N3IWF.

In an embodiment, the method of FIG. 6B may also include, at 630, transmitting, to the UE, a response including at least one IP address of the selected at least one N3IWF that supports the set of network slices targeted by the UE.

Figure 7:
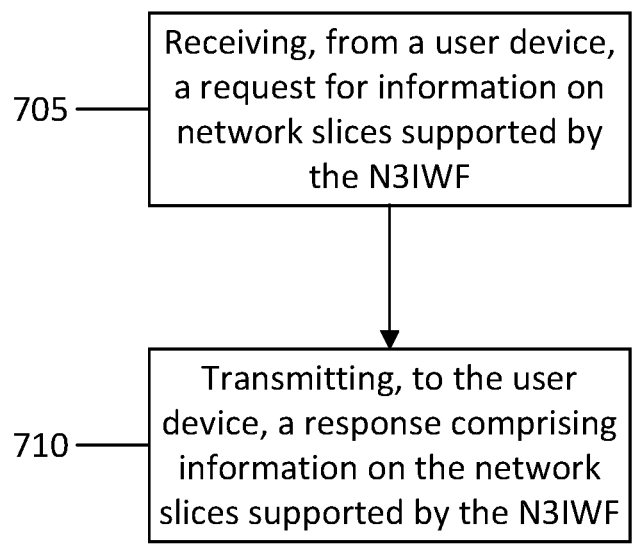
FIG. 7 illustrates an example flow diagram of a method, according to an embodiment.

FIG. 7 illustrates an example flow diagram of a method for N3IWF determination or discovery, according to an example embodiment. In certain example embodiments, the flow diagram of FIG. 7 may be performed by a network entity or communication device in a communications system such as, but not limited to, LTE, 5G NR, or 5G beyond. For instance, in some example embodiments, the device performing the method of FIG. 7 may include a N3IWF. For instance, in some embodiments, the method of FIG. 6A may include procedures or operations performed by a N3IWF, as described or illustrated elsewhere herein, such as in FIGS. 2-4.

As illustrated in the example of FIG. 7, the method may include, at 705, receiving, from a user device, a request for information on network slices supported by the N3IWF. According to some embodiments, the request may be or may include a slice support get request, which may contain an indication of a set of network slices that the user device wishes to use. As further illustrated in the example of FIG. 7, the method may include, at 710, transmitting, to the user device, a response comprising information on the network slices supported by the N3IWF. In an embodiment, the response may include at least one slice support get response from the N3IWF. According to some embodiments, the slice support get request and slice support get response may be transmitted via hyper text transfer protocol (HTTP).

In certain embodiments, the method may include registering and/or updating a profile to an AN NRF. The profile may include the set of slices the N3IWF supports and at least one IP address the N3IWF exposes to user devices to connect with.

Figure 8:
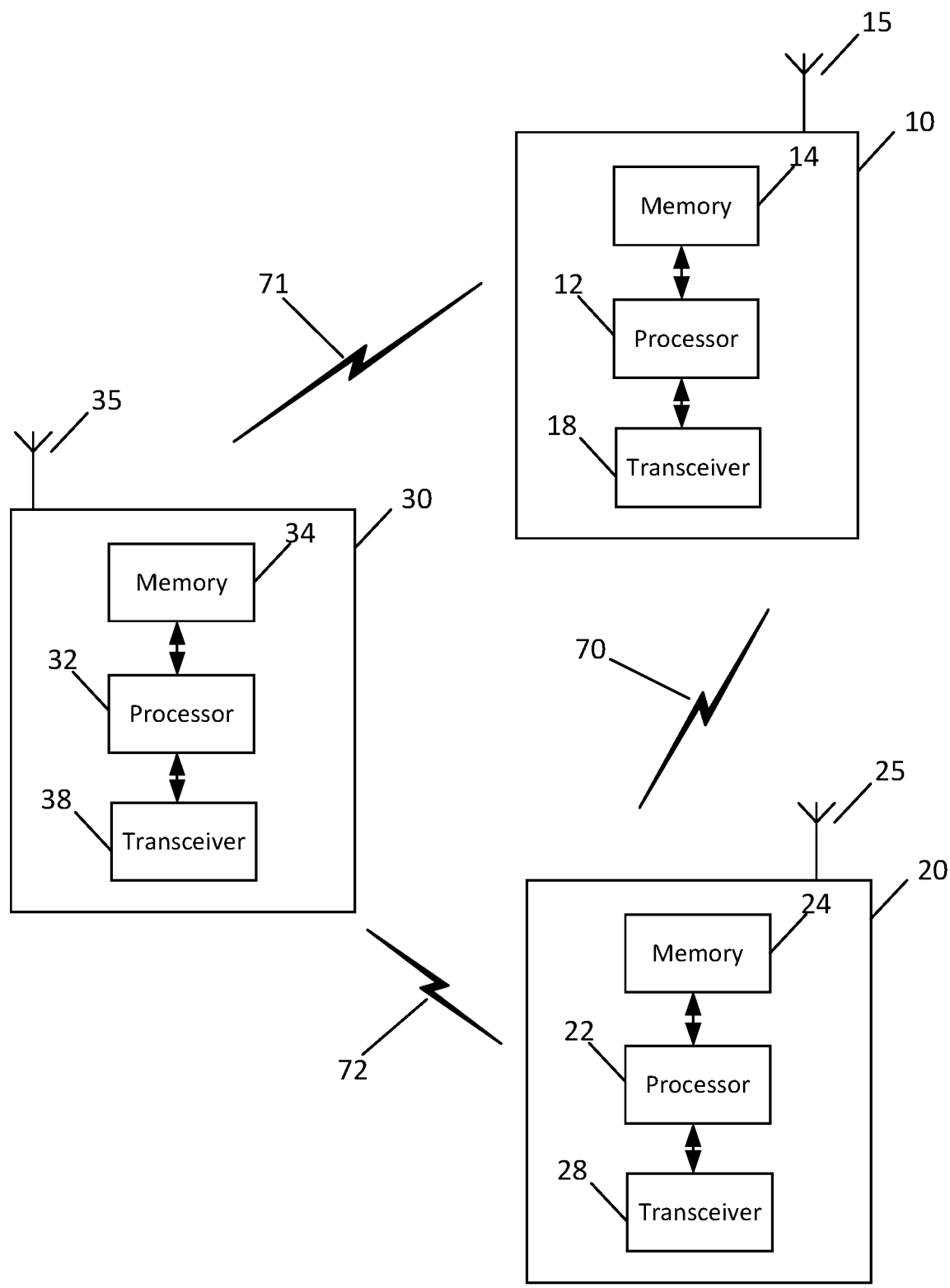
FIG. 8 illustrates an example of a system including multiple apparatuses, according to certain embodiments.

FIG. 8 illustrates an example of an apparatus 10, apparatus 20, and apparatus 30, according to certain example embodiments. In an embodiment, apparatus 10 may be a node, host, or server in a communications network or serving such a network.

For example, in one embodiment, apparatus 10 may be or may be included in a UE, user device, mobile equipment (ME), mobile station, mobile device, stationary device, IoT device, TSN device, or other device. As described herein, UE may alternatively be referred to as, for example, a mobile station, mobile equipment, mobile unit, mobile device, user device, subscriber station, wireless terminal, laptop, tablet, smart phone, IoT device, sensor or NB-IoT device, or the like. As one example, apparatus 10 may be implemented in, for instance, a wireless handheld device, a wireless plug-in accessory, or the like. It should be noted that one of ordinary skill in the art would understand that apparatus 10 may include components or features not shown in FIG. 8.

As illustrated in the example of FIG. 8, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources. In certain examples, processor 12 may be configured as a processing means or controlling means for executing any of the procedures described herein.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory.

For example, memory 14 can be comprised of any combination of random access memory (RAM), read only memory (ROM), static storage such as a magnetic or optical disk, hard disk drive (HDD), or any other type of non-transitory machine or computer readable media.

The instructions stored in memory 14 may include program instructions or computer program code that, when executed by processor 12, enable the apparatus 10 to perform tasks as described herein. In certain example embodiments, memory 14 may be configured as a storing means for storing any information or instructions for execution as discussed elsewhere herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information.

The transceiver 18 may include, for example, a plurality of radio interfaces that may be coupled to the antenna(s) 15. The radio interfaces may correspond to a plurality of radio access technologies including one or more of LTE, 5G, WLAN, NB-IoT, Bluetooth, BT-LE, NFC, radio frequency identifier (RFID), ultra-wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. In certain example embodiments, transceiver 18 may be configured as a transceiving means for transmitting and/or receiving information as discussed elsewhere herein.

Additionally or alternatively, in some embodiments, apparatus 10 may include an input and/or output device (I/O device) or means. In certain embodiments, apparatus 10 may further include a user interface, such as a graphical user interface or touchscreen.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry, processing circuitry and/or control circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may include a UE (e.g., SL UE), user device, mobile device, mobile station, ME, IoT device and/or NB-IoT device, for example. For example, in some embodiments, apparatus 10 may be configured to perform one or more of the processes depicted in any of the flow charts or signaling diagrams described herein, such as those illustrated in the examples of FIG. 1, FIG. 4 and/or FIG. 5.

For instance, in some embodiments, apparatus 10 may be configured to perform one or more of the operations performed by the UE illustrated in FIG. 1, and/or one or more of the operations performed by the UE illustrated in FIG. 4. In some embodiments, as discussed herein, apparatus 10 may be configured to perform a procedure relating to determining or discovering a suitable N3IWF to use to connect to 5GC, for instance. For example, in an embodiment, apparatus 10 may be configured, or controlled by processor 12, memory 14 and/or transceiver 18, to carry out the procedures described above with respect to FIG. 5.

FIG. 8 further illustrates an example of an apparatus 20, according to an embodiment. In an embodiment, apparatus 20 may be a node, host, or server in a communications network or serving such a network. For example, apparatus 20 may be a network node, satellite, base station, a Node B, an evolved Node B (eNB), 5G Node B or access point, next generation Node B (NG-NB or gNB), TRP, HAPS, Remote Radio Head (RRH), integrated access and backhaul (IAB) node, and/or a WLAN access point, associated with a radio access network, such as a LTE network, 5G or NR, or 6G. In some example embodiments, apparatus 20 may be gNB or other similar radio node, for instance. In further embodiments, apparatus 20 may be or may represent a N3IWF, as discussed or illustrated elsewhere herein.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection.

For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 8.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8.

As illustrated in the example of FIG. 8, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

While a single processor 22 is shown in FIG. 8, multiple processors may be utilized according to other embodiments. For example, it should be understood that, in certain embodiments, apparatus 20 may include more than one processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory.

For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means, processing circuitry/means or control circuitry/means.

As discussed above, according to some embodiments, apparatus 20 may be or may be a part of a network element or RAN node, such as a base station, access point, Node B, eNB, gNB, TRP, RRH, HAPS, IAB node, relay node, WLAN access point, satellite, or the like. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-3.

In certain embodiments, apparatus 20 may include or represent a network node, such as the N3IWF illustrated in the example of FIGS. 1-3. Therefore, in certain embodiments, apparatus 20 may be configured to perform any of the procedures or operations performed by the N3IWF as illustrated in the examples of FIGS. 1-3 According to an embodiment, apparatus 20 may be configured to perform a procedure relating to N3IWF determination, for instance.

FIG. 8 further illustrates an example of an apparatus 30, according to an example embodiment. In an example embodiment, apparatus 30 may be a node or element in a communications network or associated with such a network, such as an access network node or AN NRF, or similar node, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 8.

As illustrated in the example of FIG. 8, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 8, multiple processors may be utilized according to other example embodiments.

For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory.

For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry, processing circuitry or control circuitry.

As discussed above, according to some example embodiments, apparatus 30 may be or may include an access network node or AN NRF, for example. According to certain example embodiments, apparatus 30 may be controlled by memory 34 and/or processor 32 to perform the functions associated with example embodiments described herein. For instance, in some example embodiments, apparatus 30 may be configured to perform one or more of the processes depicted in any of the diagrams or signaling flow diagrams described herein, such as the process illustrated in the examples of FIGS. 2-4 and/or FIGS. 6A-6B. As an example, apparatus 30 may correspond to or represent the AN NRF, such as that illustrated in the examples of FIGS. 2-4. According to certain example embodiments, apparatus 30 may be configured to perform a procedure relating to an AN NRF based N3IWF discovery or determination, for instance. For example, in some embodiments, apparatus 30 may be configured to, or may be controlled by memory 34, processor 32 and/or transceiver 38 to perform one or more of the operations or procedures illustrated in the example of FIGS. 6A-6B.

In some example embodiments, an apparatus (e.g., apparatus 10 and/or apparatus 20 and/or apparatus 30) may include means for performing one or more methods, processes and/or procedures, or any of the variants discussed herein. Examples of the means may include, but are not limited to, one or more processors, memory, controllers, transmitters, receivers, sensors, circuits, and/or computer program code for causing the performance of any of the operations discussed herein, such as those illustrated or discussed in connection with FIGS. 1-6B.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments can provide systems, apparatuses, devices and/or methods for selecting a TNGF/N3IWF that supports the network slices or S-NSSAI(s) requested by a UE during registration via a non-3GPP access network, without impact to the UE. Accordingly, the use of certain example embodiments results in improved functioning of communications networks and their nodes, such as base stations, eNBs, gNBs, and/or IoT devices, UEs or mobile stations, or the like.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations needed for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, some functionality of example embodiments may be implemented as a signal that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Some embodiments described herein may use or refer to the conjunction "and/or". It should be noted that, when used, the term "and/or" is intended to include either of the alternatives or both of the alternatives, depending on the example embodiment or implementation. In other words, "and/or" can refer to one or the other or both, or any one or more or all, of the things or options in connection with which the conjunction is used.

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

5GC 5G Core Network
AMF Access and Mobility Management Function
AN NRF Access Network Network Repository Function
DNS Domain Name System
N3IWF Non 3GPP InterWorking Function
S-NSSAI Single Network Slice Selection Assistance Information
UE User Equipment.

We claim:

1. An apparatus, comprising:
at least one processor; and
at least one memory comprising computer program code,
the at least one memory and computer program code configured, with the at least one processor, to cause the apparatus at least to:
transmit a request to at least one network node, wherein the request is to requests information on network slices supported by at least one non-3GPP interworking function (N3IWF), the at least one network node comprises a set of one or more candidate non-3GPP interworking functions (N3IWFs), and the request comprises a slice support get request containing an indication of a set of network slices that the apparatus supports;
receive, from the at least one network node, a response comprising information for the at least one non-3GPP interworking function (N3IWF); and
based on the received information for the at least one non-3GPP interworking function (N3IWF), select one of the at least one non-3GPP interworking function (N3IWF) to use to connect to a 5G core network (5GC).

2. The apparatus of claim 1,
wherein the response comprises at least one slice support get response from the one or more candidate non-3GPP interworking functions (N3IWFs),
wherein the information for the at least one non-3GPP interworking function (N3IWF) comprises a set of network slices that the one or more candidate non-3GPP interworking functions (N3IWFs) support, and wherein the at least one memory and computer program code configured, with the at least one processor, to cause the apparatus at least to select the one of the at least one non-3GPP interworking function (N3IWF) that serves the set of network slices that the apparatus wishes to use based on the set of network slices that the one or more candidate non-3GPP interworking functions (N3IWFs) support.

3. The apparatus of claim 1, wherein,
when the set of one or more candidate non-3GPP interworking functions (N3IWFs) includes at least one non-3GPP interworking function (N3IWF) that supports a slice support get procedure and at least one non-3GPP interworking function (N3IWF) that does not support the slice support get procedure, the at least one memory and computer program code configured, with the at least one processor, to cause the apparatus at least to select the one of the at least one non-3GPP interworking function (N3IWF) to use in the following descending order of priority:
(a) non-3GPP interworking function (N3IWF) that supports the slice support get procedure and has indicated support for the set of network slices the apparatus wishes to use,
(b) non-3GPP interworking function (N3IWF) that does not support the slice support get procedure, and
(c) non-3GPP interworking function (N3IWF) that supports the slice support get procedure and that has indicated it does not support at least some set of slices that the apparatus wishes to use.

4. The apparatus of claim 1, wherein the slice support get request and slice support get response are transmitted via hyper text transfer protocol (HTTP).

5. The apparatus of claim 1,
wherein the at least one network node comprises an access network (AN) network repository function (NRF), and
wherein the request comprises a network function discovery request.

6. The apparatus of claim 5,
wherein the response comprises a network function discovery response from the access network (AN) network repository function (NRF),
wherein the information for the at least one non-3GPP interworking function (N3IWF) comprises a non-3GPP interworking function profile which includes at least one internet protocol (IP) address of a non-3GPP interworking function (N3IWF) that serves at least one of the set of network slices that the apparatus wishes to use, and
wherein the at least one memory and computer program code configured, with the at least one processor, to cause the apparatus at least to select one of the at least one non-3GPP interworking function (N3IWF) that serves a threshold possible set of network slices that the apparatus wishes to use.

7. The apparatus of claim 5, wherein the apparatus is configured to issue a domain name system (DNS) request to a domain name system (DNS) server to find out which network node to query for non-3GPP interworking function (N3IWF) discovery.

8. The apparatus of claim 5, wherein the selection of the one of the at least one non-3GPP interworking function (N3IWF) is based on a source internet protocol (IP) address of the apparatus which sent the request and the set of network slices that the one or more candidate non-3GPP interworking functions (N3IWFs) support.

9. A method, comprising:
transmitting, by a user device, a request to at least one network node, wherein the request requests information on network slices supported by at least one non-3GPP interworking function (N3IWF), the at least one network node comprises a set of one or more candidate non-3GPP interworking functions (N3IWFs), and the request comprises a slice support get request containing an indication of a set of network slices that the user device supports;
receiving, from the at least one network node, a response comprising information for the at least one non-3GPP interworking function (N3IWF); and
based on the received information for the at least one non-3GPP interworking function (N3IWF), selecting one of the at least one non-3GPP interworking function (N3IWF) to use to connect to a 5G core network (5GC).

10. The method of claim 9,
wherein the response comprises at least one slice support get response from the one or more candidate non-3GPP interworking functions (N3IWFs),
wherein the information for the at least one non-3GPP interworking function (N3IWF) comprises a set of network slices that the one or more candidate non-3GPP interworking functions (N3IWFs) support, and
wherein the selecting comprises selecting the one of the at least one non-3GPP interworking function (N3IWF) that serves the set of network slices that the user device wishes to use based on the set of network slices that the one or more candidate non-3GPP interworking functions (N3IWFs) support.

11. The method of claim 9, wherein,
when the set of one or more candidate non-3GPP interworking functions (N3IWFs) includes at least one non-3GPP interworking function (N3IWF) that supports a slice support get procedure and at least one non-3GPP interworking function (N3IWF) that does not support the slice support get procedure, the selecting comprises selecting the one of the at least one non-3GPP interworking function (N3IWF) to use in the following descending order of priority:
(a) non-3GPP interworking function (N3IWF) that supports the slice support get procedure and has indicated support for the set of network slices the user device wishes to use,
(b) non-3GPP interworking function (N3IWF) that does not support the slice support get procedure, and
(c) non-3GPP interworking function (N3IWF) that supports the slice support get procedure and that has indicated it does not support at least some set of slices that the user device wishes to use.

12. The method of claim 9, wherein,
the user device learns whether a non-3GPP interworking function (N3IWF) supports a slice support get procedure in response to a domain name system (DNS) query the user device sends to discover the candidate non-3GPP interworking functions (N3IWF).

13. The method of claim 9,
wherein the at least one network node comprises an access network (AN) network repository function (NRF), and
wherein the request comprises a network function discovery request.

14. The method of claim 13,
wherein the response comprises a network function discovery response from the access network (AN) network repository function (NRF),
wherein the information for the at least one non-3GPP interworking function (N3IWF) comprises a non-3GPP interworking function profile which includes at least one internet protocol (IP) address of a non-3GPP interworking function (N3IWF) that serves at least one of the set of network slices that the user device wishes to use, and
wherein the selecting comprises selecting one of the at least one non-3GPP interworking function (N3IWF) that serves a threshold possible set of network slices that the user device wishes to use.

15. An apparatus, comprising:
at least one processor; and
at least one memory comprising computer program code,
the at least one memory and computer program code configured, with the at least one processor, to cause the apparatus at least to:
receive a register request or update request from at least one non-3GPP interworking function (N3IWF), wherein the register request or update request comprises an indication of a set of network slices supported by the at least one non-3GPP interworking function (N3IWF) and at least an internet protocol (IP) address of the at least one non-3GPP interworking function (N3IWF) for use by user devices connecting to the N3IWF, wherein the set of network slices are indicated as being supported by a user device;
store or update a non-3GPP interworking function (N3IWF) profile comprising the set of network slices supported by the at least one non-3GPP interworking function (N3IWF) and the internet protocol (IP) address(es) of the at least one non-3GPP interworking function (N3IWF) for use by user devices connecting to the N3IWF;
receive, from a user device, a discovery request comprising a set of network slices targeted by the user device;
based on the non-3GPP interworking function (N3IWF) profile, select at least one non-3GPP interworking function (N3IWF) that supports at least one of the set of network slices targeted by the user device; and
transmit, to the user device, a response comprising the set of non-3GPP interworking function profiles supporting at least one of the network slices targeted by the user device.

16. The apparatus of claim 15, wherein, to select at least one non-3GPP interworking function (N3IWF) that supports at least one of the set of network slices targeted by the user device, the at least one memory and computer program code configured, with the at least one processor, to cause the apparatus at least to:
determine an appropriate non-3GPP interworking function (N3IWF) to select for the user device taking into account the set of network slices targeted by the user device and a distance between the internet protocol (IP) address of the user device and the internet protocol (IP) address of the at least one non-3GPP interworking function (N3IWF).

17. The apparatus of claim 15, wherein the at least one memory and computer program code configured, with the at least one processor, to cause the apparatus at least to:
transmit a register or update response to the at least one non-3GPP interworking function (N3IWF).

18. An apparatus, comprising:
at least one processor; and
- at least one memory comprising computer program code,
- the at least one memory and computer program code configured, with the at least one processor, to cause the apparatus at least to:
- receive, from a user device, a request for information on network slices supported by the apparatus, wherein the request comprises a slice support get request containing an indication of a set of network slices that the user device supports; and
- transmit, to the user device, a response comprising information on the network slices supported by the apparatus, wherein the response comprises at least one slice support get response.

19. The apparatus of claim 18, wherein the slice support get request and slice support get response are transmitted via hyper text transfer protocol (HTTP).

20. The apparatus of claim 18, wherein the apparatus is configured to at least one of register or update a profile to an access network (AN) network repository function (NRF), the profile comprising the set of slices the apparatus supports and at least one internet protocol (IP) address the apparatus exposes to user devices to connect with.

\* \* \* \* \*